No. 880,549. PATENTED MAR. 3, 1908.
L. P. LORD.
BOX FOR TRANSPORTING POTTED PLANTS.
APPLICATION FILED OCT. 5, 1906.

2 SHEETS—SHEET 1.

WITNESSES
A. M. Walstrom
J. B. Eva.

INVENTOR
LEWIS P. LORD
BY Paul & Paul
HIS ATTORNEYS

No. 880,549.  PATENTED MAR. 3, 1908.
L. P. LORD.
BOX FOR TRANSPORTING POTTED PLANTS.
APPLICATION FILED OCT. 5, 1906.

2 SHEETS—SHEET 2.

WITNESSES

INVENTOR
LEWIS P. LORD
BY
HIS ATTORNEYS

UNITED STATES PATENT OFFICE.

LEWIS P. LORD, OF OWATONNA, MINNESOTA.

BOX FOR TRANSPORTING POTTED PLANTS.

No. 880,549.  Specification of Letters Patent.  Patented March 3, 1908.

Application filed October 5, 1906. Serial No. 337,537.

*To all whom it may concern:*

Be it known that I, LEWIS P. LORD, of Owatonna, Steele county, Minnesota, have invented certain new and useful Improvements in Boxes for Transporting Potted Plants, of which the following is a specification.

My invention relates to devices for use in shipping or carrying potted plants from place to place, and the object of the invention is to simplify and reduce the cost of manufacturing the invention shown and described in Letters Patent of the United States issued to me May 24, 1904, No. 760,886.

The invention consists generally in providing means independent of the box proper for bracing the pot and plant and holding them in their proper position in the end of the box.

Figure 1:
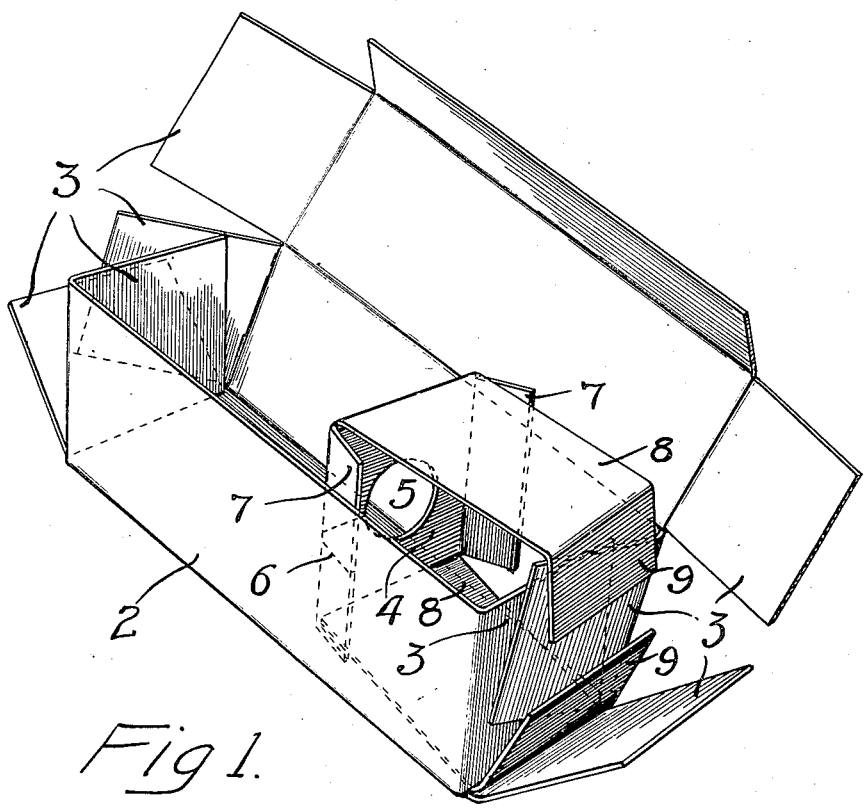
Figure 2:
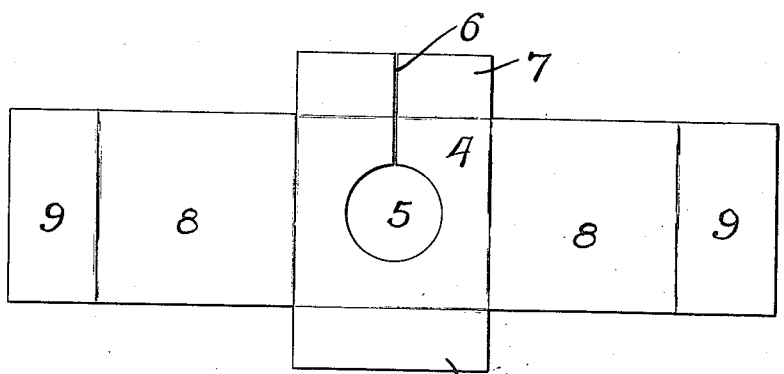
Figure 3:
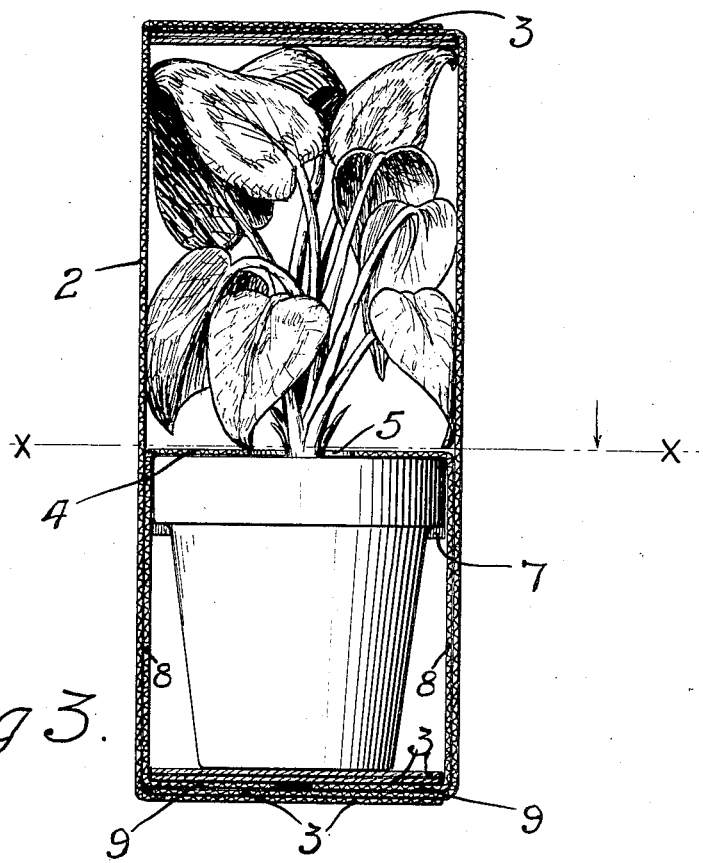
Figure 4:
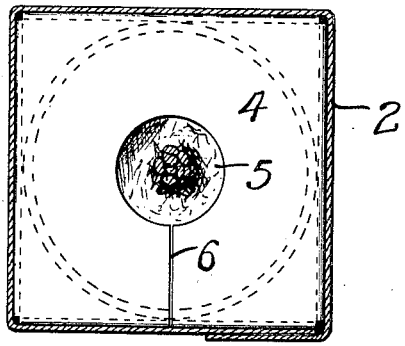

In the accompanying drawings, forming part of this specification, Figure 1 is a perspective view of a box embodying my invention. Fig. 2 is a top view showing the box open. Fig. 3 is a vertical sectional view illustrating the manner of using the box. Fig. 4 is a horizontal sectional view on the line x—x of Fig. 3.

In the drawing, 2 represents a collapsible box of substantially the form and construction shown in my Letters Patent above referred to, and provided at the end, as shown, with a series of flaps 3 formed on the side walls and adapted to fold over one upon another and form a yielding support for the base of the pot.

4 is a plate of flexible material adapted to rest upon the top of the flower pot and having a centrally arranged hole 5 to receive the stem of the plant and a slit 6 extending to the edge of the plate through which the plant stem is inserted into the hole 5. Short flaps 7 are provided on two of the edges of the plate 4 and are adapted to fold down over the edge of the pot between it and the wall of the box forming cushions at that point, to prevent injury or breakage of the pot during transportation. The other two edges of the plate 4 are provided with longer flaps 8 that extend down to the end of the box and have inwardly turned ends 9 that are slipped in between the flaps on two sides of the box and the corresponding flaps on the other sides, as shown in Fig. 1. Then when a cord has been passed around the box the pot will be securely held therein and prevented from slipping out of place and causing injury or breakage to the plant. The flaps 8 will be made of different length according to the height of the pot and the plate 4, in preparing a plant for transportation, will be first placed thereon and the pot inserted into the box. Then the flaps on two sides will be folded in between the bottom of the pot and the ends 9 turned in against said flaps, and finally, the remaining flaps on the box will be folded in beneath the ends 9. The flaps 8 extending down on two sides of the pot will protect it to a considerable extent from injury, and render the box stiffer and more substantial at the point where it is subject to the greatest strain.

I do not wish to confine myself to any particular material for manufacturing the article, nor to the size of the same as both may be varied without departing from my invention.

I claim as my invention:

1. As a new article of manufacture, a folding box of flexible material having collapsible side and end walls arranged when folded to inclose potted plants placed lengthwise therein resting on one end of the box, and a part intermediate to said ends and detachably fitting within said box and having a hole to receive the stalk of the plant and adapted to rest upon the top of the pot and provided with flaps that extend down beside the pot and having their ends inserted between the flaps on the end of the box, for the purpose specified.

2. As a new article of manufacture, a folding box of flexible material, having collapsible side and end walls, the latter composed of flaps folded in one upon another, a flexible plate having a hole to receive the plant stalk, and adapted to rest upon the top of the pot, and provided with flaps of substantially the same length as the height of the pot, and provided with inwardly turned ends adapted to be inserted between the flaps on two of the box sides and those on the other sides and said flaps contacting with said walls and preventing lateral movement of the pot when the device is in use, substantially as described.

3. As a new article of manufacture, a packing box for plants, composed of flexible material and having side walls adapted to be folded with their edges lapping by one another to inclose the plant, and each wall having a flap at its end that is adapted to be inserted between the corresponding flaps at that end and form a support or rest for the pot, and a plate adapted to be placed intermediate to said ends and having a hole to receive the stalk of the plant and rest upon the top of the pot and provided with depending ends that extend down beside the pot and said ends terminating in inwardly turned portions that are inserted between the end flaps beneath the pot whereby the pot will be held against accidental movement and said plate being separable from said box and the said ends filling the space between the upper portion of the pot and the walls of the box when the device is in use and preventing lateral movement of the pot.

4. As a new article of manufacture, a packing box for plants, composed of flexible material and having side walls adapted to be folded with their edges lapping by one another to inclose the plant and each wall having a flap at its end that is adapted to be inserted between the corresponding flaps of the other walls at that end and forming a support or rest for the pot when placed in the box, and a plate removably fitting within said box intermediate to its ends and transversely thereof and having a hole to receive the stalk of the plant and adapted to rest upon the top of the pot, and said plate being provided with depending ends that extend down beside the pot to the bottom thereof and said ends terminating in inwardly turned portions that are inserted between the end flaps beneath the pot, and said plate also having depending ends extending down beside the pot and terminating above the lower portion thereof, substantially as described, and for the purpose specified.

In witness whereof, I have hereunto set my hand this 2d day of October 1906.

LEWIS P. LORD.

Witnesses:
RICHARD PAUL,
J. B. EVA.